(12) United States Patent
Rogers

(10) Patent No.: US 7,072,244 B2
(45) Date of Patent: Jul. 4, 2006

(54) UNDERWATER EXTERIOR SHIP HULL IMAGING SYSTEM EMPLOYING A REMOTE MICROPROCESSOR CONTROLLED ACOUSTIC TRANSDUCER ARRAY

(75) Inventor: Mark S. Rogers, St. Petersburg, FL (US)

(73) Assignee: Hull Underwater Imaging Systems, Inc., St. Petersburg, FL (US)

( * ) Notice: Subject to any disclaimer, the term of this patent is extended or adjusted under 35 U.S.C. 154(b) by 0 days.

(21) Appl. No.: 10/862,028

(22) Filed: Jun. 4, 2004

(65) Prior Publication Data

US 2006/0114748 A1 Jun. 1, 2006

(51) Int. Cl.
*G01S 15/89* (2006.01)
*G01S 15/00* (2006.01)

(52) U.S. Cl. .................................... 367/88; 367/87
(58) Field of Classification Search ................ 367/87, 367/88, 131
See application file for complete search history.

(56) References Cited

U.S. PATENT DOCUMENTS

| | | | |
|---|---|---|---|
| 3,426,585 A | 2/1969 | Zemanek, Jr. et al. | |
| 3,776,574 A | 12/1973 | Henderson et al. | |
| 4,102,203 A | 7/1978 | Sylvester et al. | |
| 4,628,737 A | 12/1986 | Charles et al. | |
| 5,047,990 A * | 9/1991 | Gafos et al. | 367/6 |
| 5,894,450 A | 4/1999 | Schmidt et al. | |
| 6,084,827 A * | 7/2000 | Johnson et al. | 367/103 |
| 6,115,681 A * | 9/2000 | Foreman et al. | 702/188 |
| 6,317,387 B1 | 11/2001 | D'Amaddio et al. | |
| 6,571,635 B1 | 6/2003 | Baltzersen et al. | |
| 6,847,584 B1* | 1/2005 | Deason et al. | 367/7 |
| 2003/0058738 A1 | 3/2003 | Erikson | |
| 2004/0013471 A1 | 1/2004 | Matthews | |

\* cited by examiner

*Primary Examiner*—Ian J. Lobo
(74) *Attorney, Agent, or Firm*—Larson & Larson, PA; Herbert W. Larson

(57) ABSTRACT

A multi-beam acoustic transducer array system for producing color enhanced, three dimensional, high resolution images of a ship's underwater hull, wherein the acoustic transducers can be mounted in orthogonal pairs, each pair being positioned opposite from another pair within a shipping channel. The array can be utilized either in a stationary configuration within a controlled shipping lane or suspended in the water column from a mobile support vessel, with at least one array being orthogonally mounted and suspended in the water column from the mobile support vessel, wherein the mobile configuration obviates the need for multiple orthogonal arrays, for purposes of performing acquisition and imaging of a ship's hull. Each orthogonal array consists of a first transducer transmitting sonar pulses along a horizontal plane and a second transducer transmitting sonar pulses along a vertical plane, such that the two beaming sonar pulses are orthogonal, thereby providing optimal coverage.

11 Claims, 8 Drawing Sheets

UNDERWATER EXTERIOR SHIP HULL IMAGING SYSTEM EMPLOYING A REMOTE MICROPROCESSOR CONTROLLED ACOUSTIC TRANSDUCER ARRAY

BACKGROUND OF THE INVENTION

1. Field of the Invention

The present invention relates to a method for imaging an exterior ship hull while underway or anchored using a remote sensing multi-beam sonar system array. More particularly, it relates to a multi-beam sonar array wherein a plurality of acoustic transducers are installed either in a shipping channel in a configuration that permits a ship's hull to be imaged while in transit through a channel or while the ship is stationary in an anchorage.

2. Description of the Prior Art

The capability to inspect the underside of freight ships and large vessels has always been of great concern for ports of entry, ports of call, and country port borders. It is well known that ships such as these have been frequently used to smuggle illegal drugs and contraband through ports of entry. This concern has been elevated in recent years as the focus has shifted to include nuclear, chemical, and/or biological agents, explosives, and any materials necessary to construct the foregoing. In many cases, these goods are smuggled through ports of entry on the underside of a vessel or ship by constructing a false bottom on the hull and storing these illegal or restricted items in the space created between the actual hull and the false bottom of the ship or vessel.

Inspection of a ship's interior spaces requires the use of scent dogs, inspection personnel and/or electronic devices, all of which are cost and labor intensive. Inspection of the underside of a submerged vessel is an even more difficult task, particularly since these ships, at a minimum, are more than several hundred feet long and draw between ten to twenty-five feet, depending on whether they are loaded with cargo.

One method of inspecting hulls, known in the prior art, is to send a diver to observe the underside of the ship through traditional visual means. U.S. Pat. No. 3,776,574 describes a process for the inspection of a submerged vessel whereby a diver employs a motion picture camera connected to a transmission cable to record the condition of the hull while submerged underwater. One drawback to this type of prior art system is that manpower is required to record every square inch of the submerged hull, thereby adding expense and time to the inspection process of the vessel. Other factors, such as environmental conditions can also have detrimental effects on the quality of the recordings and include water clarity, water temperature, and salinity. It should be noted that ideal visual imaging conditions almost never exist in marine port and docking facilities. Visual water clarity is typically measured in inches, thus allowing for divers to miss crucial areas of the hull during inspection dives. This prior art process is clearly inadequate and antiquated for today's needs in border protection, control, and inspection.

Advances in sonar technology have produced much better results than traditional visual inspection. Sonar technology uses sound echoes (acoustic reflected imaging) to produce an visual image of an object. A transducer converts electrical energy to sound energy and propagates sound pulses through the water in a wide angular plane. The pulses bounce off the intended object to be observed and the reflected pulse (echo) is recorded by a sensor coupled to the system. The data is transmitted to a processor which integrates the received signals to create and display a visual image. However, a limitation to sonar is the Doppler Effect which occurs with sound waves. The Doppler Effect is responsible for a shift in frequency of the sound wave of a moving object as it passes by. As an object is moving towards you or a sensor, the frequency of the sound wave appears higher, since the perceived wavelength is shortened thereby producing a higher pitched sound. When the object passes by you and continues to move away, the sound wave appears to stretch out, producing a lower frequency (perceived longer wavelengths), which in turn produces a low frequency sound. In underwater sonar, the Doppler Effect can attenuate sound waves and cause distorted imaging thereby playing havoc on the desired results. In addition, sound waves in the water column can be distorted by variations in suspended particles, salinity, density, temperature, surface and subsurface wave activity, and bottom features. To combat these conditions, the prior art devices involve mobile units which are manipulated across a surface of an observed object or towed units, which follow closely behind an observed object in order to minimize image distortion of the Doppler Effect and other annoying conditions.

U.S. Pat. No. 3,426,585 utilizes sonar technology to inspect the condition of submerged surfaces such as pilings. A transducer moves along a series of rods and about a periphery of a piling in a scanning pattern, transmitting sound pulses. The pulses are reflected back and a sensor of the transducer records the condition of the object. This type of transducer would not be suitable for inspecting objects such as large freight tankers. U.S. Pat. No. 6,317,387 describes a remotely operated vehicle (ROV) equipped with inspection cameras and position sensing equipment. The ROV is introduced into the water from the port and propels itself over the surface of a submerged hull to measure and record characteristics of the hull. This device does not employ sonar technology and is greatly inhibited by poor water quality in the same way that divers are inhibited during inspection dives. Furthermore, a remote operated vehicle requires extensive training, manpower and support to operate and to maintain the vehicle and is therein inadequate for today's needs.

U.S. Pat. No. 4,102,203 describes a process for inspection of a submerged surface of an underwater hull or vessel. This device utilizes a mobile transducer to inspect the underside of a ship, which is afloat. The transducer takes recordings, which are processed to create a visual image. The image produced by this prior art device is limited to a pictorial diagram and does not contain the high level of detail desired for a thorough and accurate representation of a ship's hull. Other devices are known in the prior art that employ transducers mounted on a platform or a cylindrical "fish" and towed behind a ship and used in bathymetry (the study of the depths of the ocean). These devices too are inadequate for today's needs since they are incapable of producing a clear image of the ship hull as it passes by the transducers.

There is a great need for a device that utilizes a sonar transducer array to produce real-time three dimensional, high resolution images that can be operated both in a stationary configuration and/or in a mobile configuration, and that allows for quick and accurate imaging of a ship's hull as it passes through a shipping channel or while it lies at anchor, yet is able to overcome all of the limitations associated with the use of prior art underwater sonar devices. The system should be able to render accurate images quickly so that human analysis can be conducted quickly such that suspicious vessels can be segregated from those not posing any terrorist risk or violating any laws of the sovereign nation's port of entry.

SUMMARY OF THE INVENTION

I have invented a multi-beam acoustic transducer array system for producing color enhanced, three dimensional, high resolution images of a ship's underwater hull. The array system can be utilized either in a stationary configuration within a controlled shipping lane or suspended in the water column from a mobile support vessel. In a preferred embodiment of the stationary configuration, the acoustic transducers can be mounted in orthogonal pairs whereby each pair is positioned on opposite sides of a shipping channel. In a preferred embodiment of the mobile configuration, at least one orthogonal mounted transducer array is suspended in the water column from the mobile support vessel to perform acquisition and imaging of a ship hull. The mobile and stationary configurations can operate as stand alone systems and are not dependent on another in the present invention. However, they may be utilized in coincidence to render an image of the same ship hull.

Each orthogonal array consists of a first transducer mounted to a stationary member for transmitting continuous sonar pulses along a horizontal plane and a second transducer mounted to the same stationary member for transmitting continuous sonar pulses along a vertical plane such that the two beaming sonar pulses are orthogonal, thereby providing optimal and redundant coverage. Multiple transducer pairs are employed along the stationary member at top and bottom positions within the channel to scatter acoustic waves from multiple positions as a ship passes through the channel. The acoustic transducer array system utilizes echolocation for imaging a ship's hull, displayed on a monitor or printer, by emitting sound waves and analyzing the waves reflected back to the sender by the ship's hull through a microprocessor controlled central unit and processor suite. In particular, reflected signals received back from the ship by the transducers are transmitted to a central processing unit (CPU) and imaging unit which integrates the signals into electrical data to create a visual image on the monitor utilizing a software rendering program. The rendered image of the underwater hull produced by the CPU and imaging unit from the transducer signals is an enhanced, high resolution, three dimensional image of the ship hull, whereby features of the hull's configuration, such as intakes, anodes, keel coolers, and stabilizers, just to name a few, would be revealed and establish a baseline for providing Homeland Security, law enforcement, and port personnel with the necessary data needed to determine whether a ship hull is suspicious in appearance warranting detention, whereby the stored digital image could be used for future analysis and comparisons upon return transits. The enhanced image, produced by my novel transducer array system, provides an additional level of security for detecting hull anomalies, which, upon further inspection, may prove to be chemical and/or biological agents, explosive devices, or other contraband materials.

BRIEF DESCRIPTION OF THE DRAWINGS

This invention can be best understood by those having ordinary skill in the art by reference to the following detailed description, when considered in conjunction with the accompanying drawings in which.

DETAILED DESCRIPTION OF THE INVENTION

Figure 1:
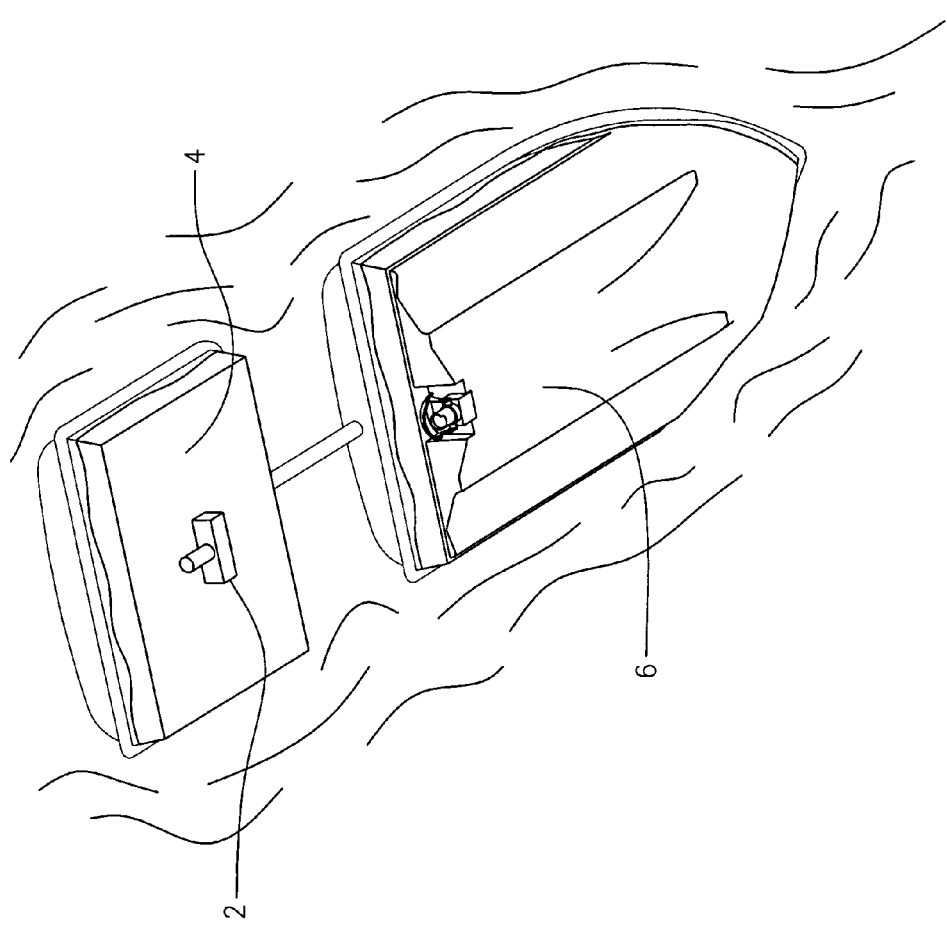
FIG. 1 is a bottom side perspective view of a prior art sonar device or acoustic transducer for use in imaging ocean and sea floor beds.

Throughout the following detailed description, the same reference numerals refer to the same elements in all figures.

Referring to FIG. 1, a prior art sonar device is shown. In such device, a transducer 2 is mounted on a bottom side of a platform 4. The platform 4 is attached to a stern portion of a boat 6 and towed from behind and is used to map ocean and seabed floors. To do such, transducer 2 propagates a sonic pulse downwardly and records a signal from the pulse when it is reflected off the ocean or seabed floor (not shown). The device of FIG. 1 is not used in the imaging of boat hulls as in the present invention. However, transducer 2 is an example of one acoustic transducer that can be employed as one of a pair in the present invention of an array of transducer pairs.

Figure 2:
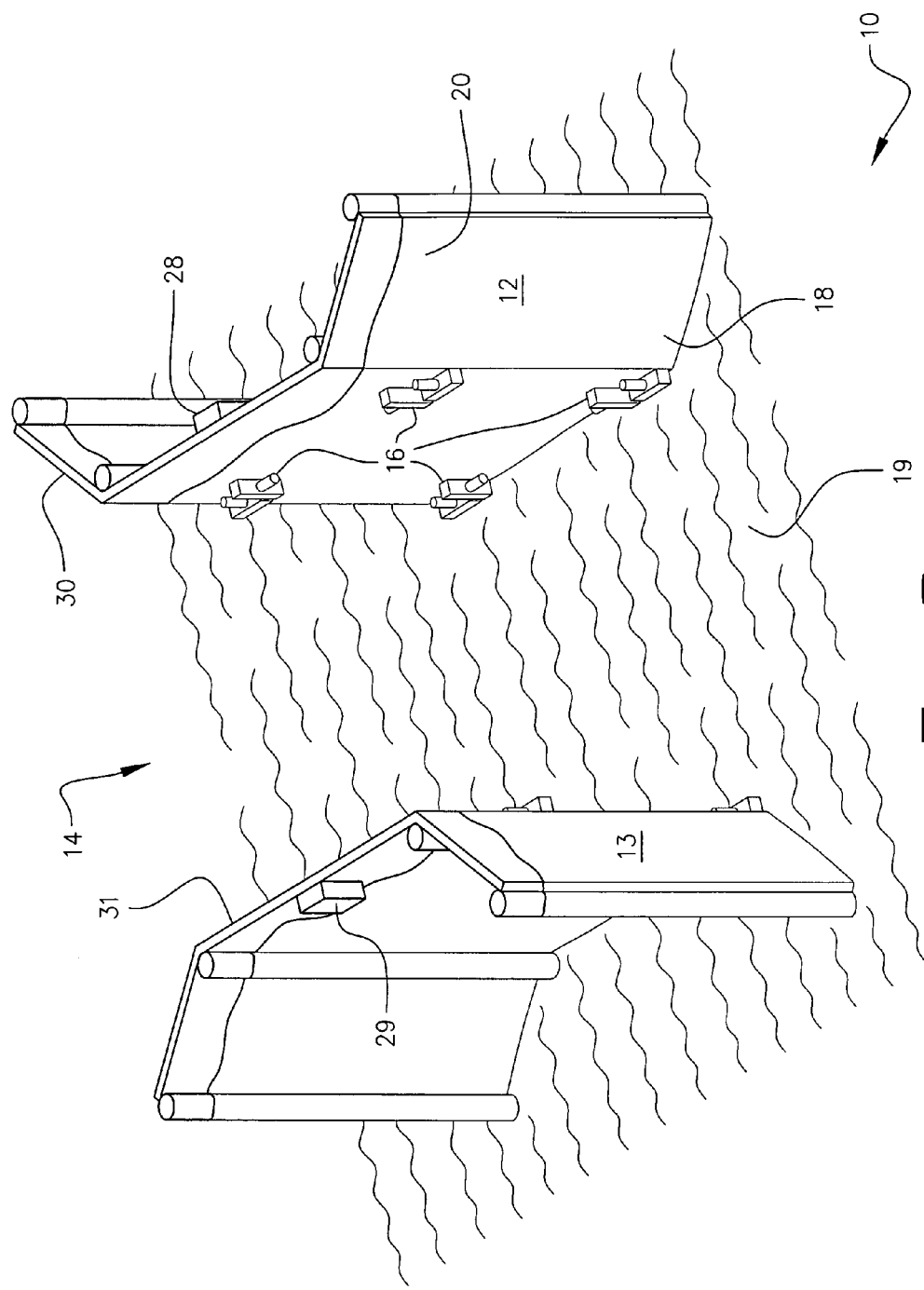
FIG. 2 is a top side perspective view of an array of acoustic transducers employed in the present invention mounted on a pair of fender s defining a shipping channel.
Figure 3:
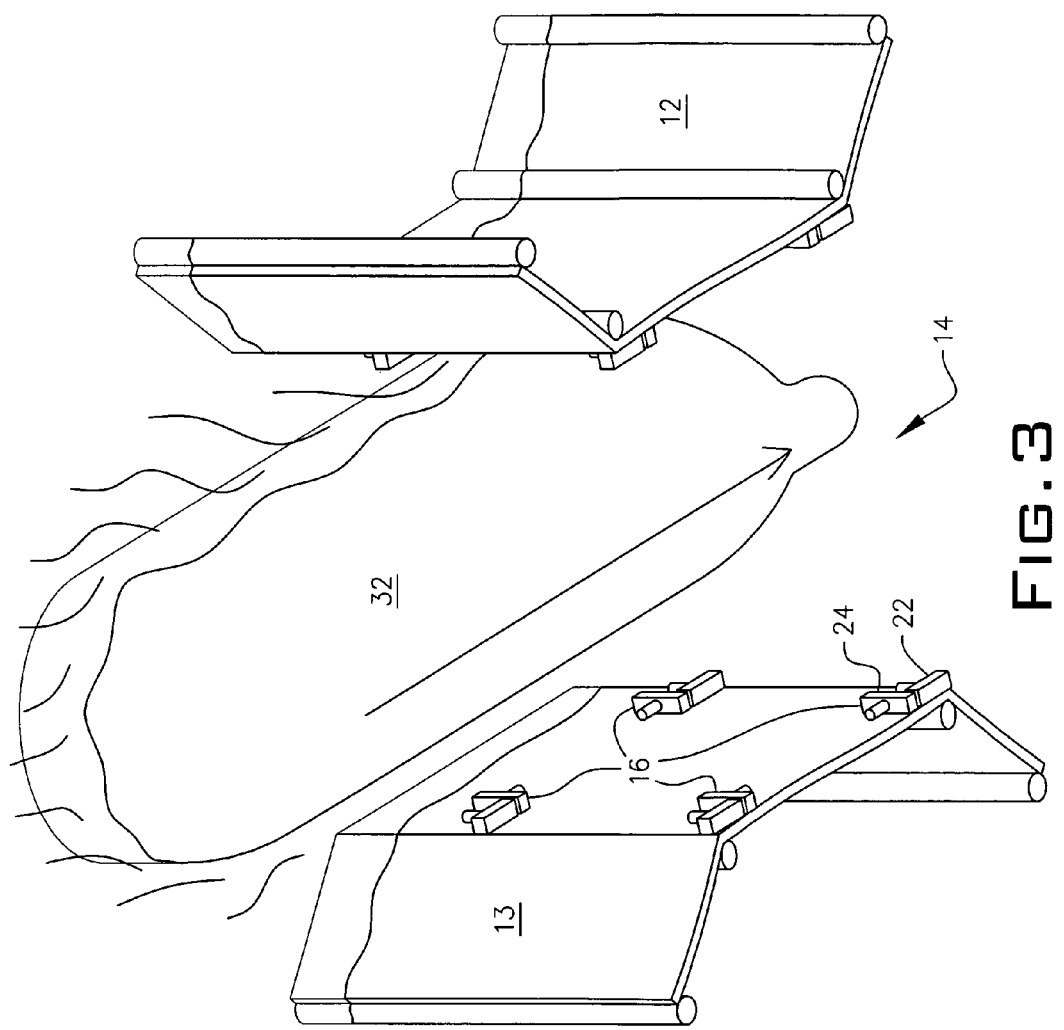
FIG. 3 is a bottom side perspective view of a ship passing through a shipping channel defined by a pair of fender s supporting an array of acoustic transducers employed in the present invention for rendering a three-dimensional image of the ship hull passing through the shipping channel.

Referring to FIGS. 2 and 3, a stationary multi-beam transducer array 10 is positioned on a first and second fender wall, 12 and 13 respectively, along each side of a shipping channel 14 (fenders 12 and 13 can also be known as bridge and fender assemblies). Fenders 12 and 13 are typically a man-made wall designed to protect shipping channel 14 from any crashing waves of the ocean. It also acts to direct ships through specific shipping channels by defining a definitive channel pathway, which has been dredged for this purpose. The present invention works extremely well with these defined shipping channels, since stationary array 10 of the present invention can be used to observe every single ship and vessel that passes through the shipping channel 14. A mobile array can also be employed in the present invention and will be discussed hereinafter in full detail. For the purposes of this application, an array (either stationary or mobile) is defined as a single transducer head.

Stationary transducer array 10, of FIG. 2, employs a plurality of transducer pairs 16 positioned on first fender wall 12 and second fender wall 13 along each side of shipping channel 14. A portion of stationary transducer array 10 has some transducer pairs 16 positioned at a lower level 18 of array 10, which is at or near a sea floor 19 of channel 14. Another portion of stationary transducer array 10 has other transducer pairs 16 positioned at high level 20 of array 10, which is just below the water surface (such as, for example, 10' below the water surface level or mean water line).

Figure 4:
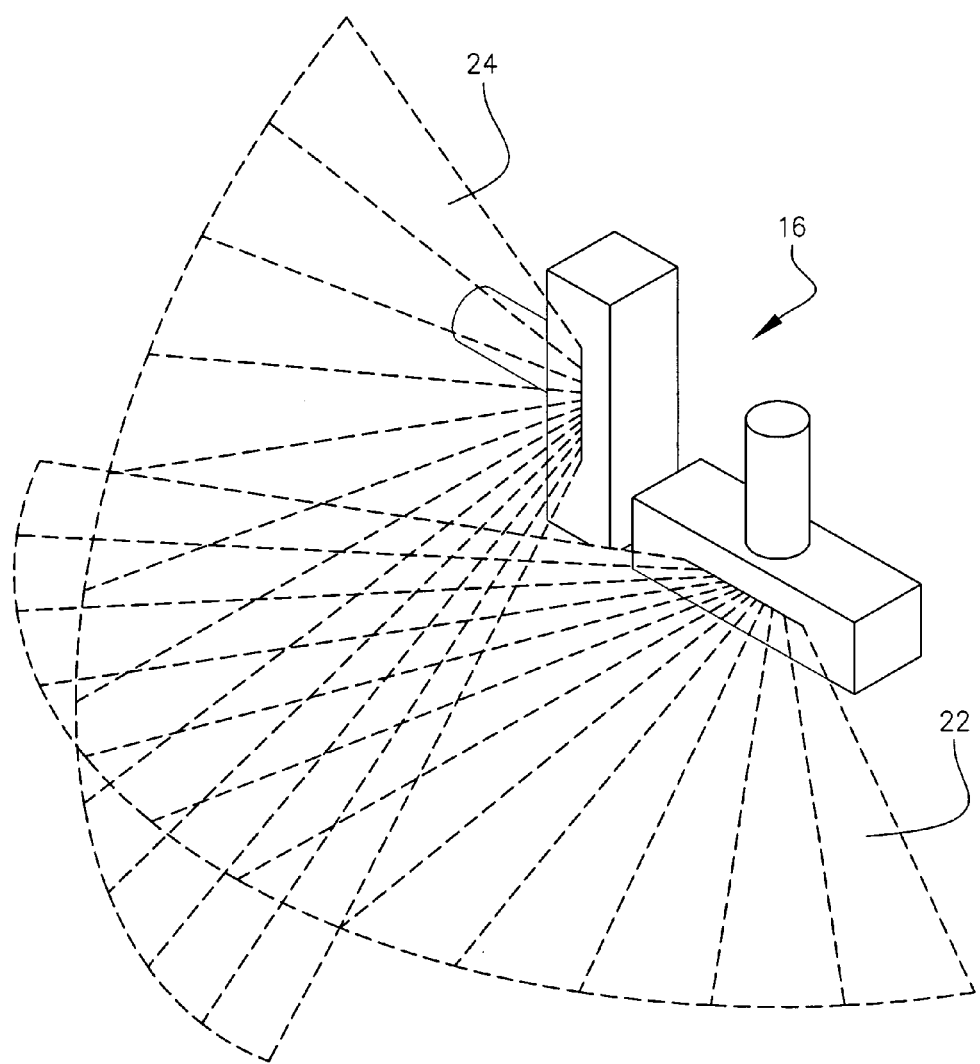
FIG. 4 is a perspective view of a pair of acoustic transducers used in the present invention, one transducer of each pair mounted such that sonar pulses emanating therefrom are directed in a horizontal plane and the other transducer of each pair mounted such that sonar pulses emanating therefrom are directed in a vertical plane; the two sonar beam planes disposed orthogonal from one another.
Figure 5:
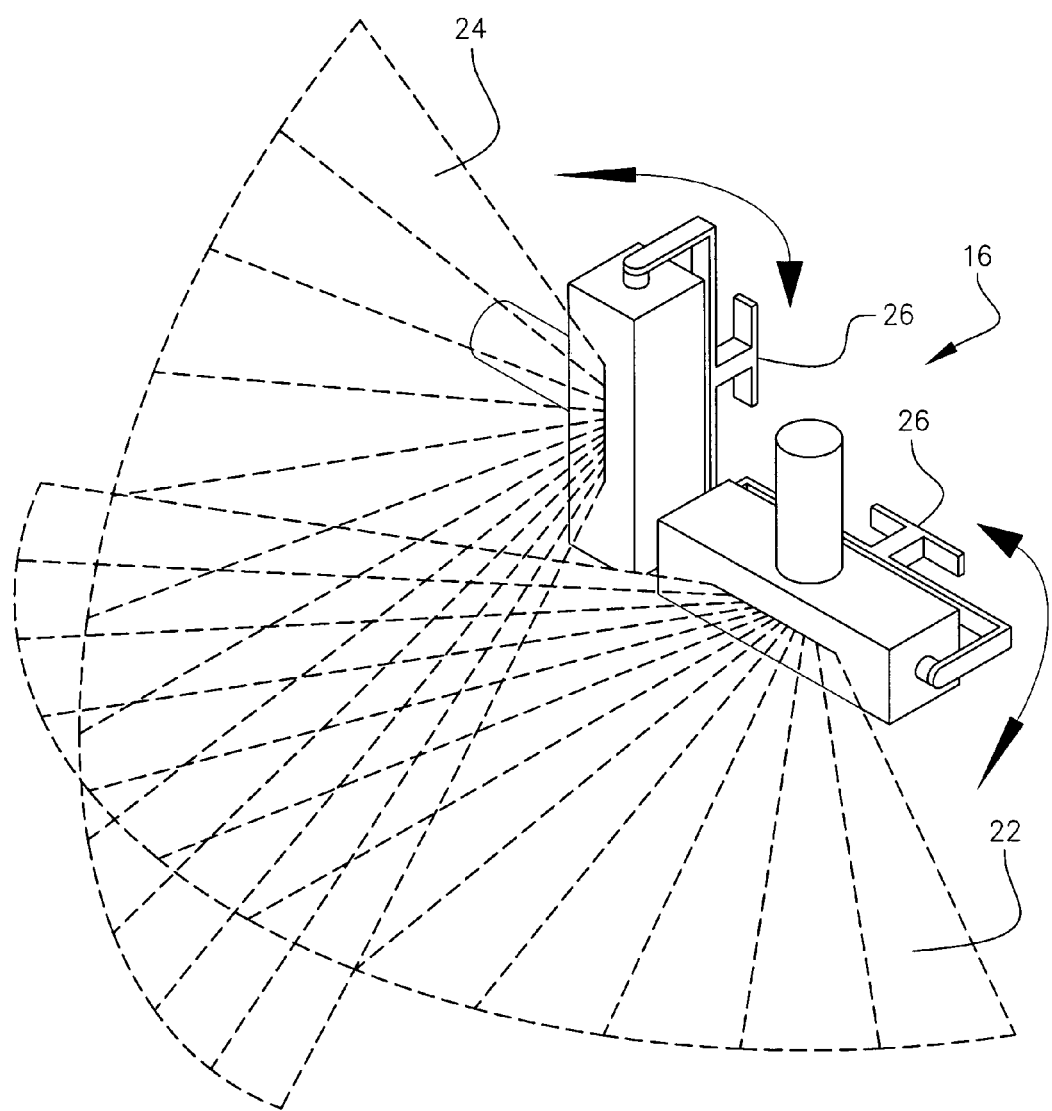
FIG. 5 is a perspective view of a pair of acoustic transducers used in an alternate embodiment of the present invention, a first transducer of each pair mounted on a first swivel such that the sonar pulses emanating therefrom are directed in an adjustable horizontal plane, the second transducer of the pair mounted on a second swivel such that the sonar pulses emanating therefrom are directed in an adjustable vertical plane; the two sonar beam planes remaining orthogonally disposed from one another as in the preferred embodiment regardless of the positioning of either swivel.

Referring to FIG. 4, each transducer pair 16 contains a first transducer for emitting a horizontal beam 22 and a second transducer for emitting a vertical beam 24 positioned such that the two beams are orthogonal to one another (perpendicular to the plane of orientation). In the preferred embodiment, a beam spread of 120 degrees is employed. The horizontal beam refers to that which is parallel to the plane of the horizon or perpendicular to the direction of gravity. The vertical beam is that which is perpendicular (orthogonal) to the horizontal beam. As shown on FIG. 5, an alternate embodiment can be used with array 10, wherein each transducer pair 16 has a first transducer emitting a horizontal beam 18 and the second transducer emitting a vertical beam 24 with the first and second transducers mounted on a swivel 26 to the stationary member (i.e., the fender). When employed, swivel 26 permits horizontal beam 18 and vertical beam 24 to rotate in approximately a 45° angle along their respective planes. This provides positional calibration at time of installation and re-positional calibration at any time thereafter. Use of swivel 26 does not effect the orthogonal relationship to first and second transducers of each pair regardless of whether both transducers of a specific pair are swivelled or just one transducer of a specific pair is swivelled.

Referring to FIG. 2, a first processor suite 28 is mounted above the water at a top edge 30 of fender wall 12. A second processor suite 29 is mounted above the water level at a top edge 31 of second fender wall 13 generally opposite one another. First processor suite 28 collects data from the plurality of transducer pairs 16 mounted on its respective fender wall 12. Whereas, second processor suite 29 collects data from the plurality of transducer pairs 16 mounted on its respective fender wall 13. However, nothing herein limits other configurations for processor suites 28 and 29 (in fact, although not shown, just one processor suite could be employed for the entire array 10). In the preferred embodiment, transducer pairs 16 are connected to their respective processor suites, 28 and 29, by a tethered or cable connection, although other forms of coupling could be employed, such as, for example, any known wireless connection, including, but not limited to, RF carrier, cellular, laser, satellite uplink, FOI, 802.11 and Bluetooth. These wireless communications would work best with a air-water interface, since signals from transducer pairs 16 would originate from underneath the water surface.

Data from first and second processor suites, 28 and 29 respectively, is uploaded to a central processor unit (CPU) and imaging device (not shown), typically located remotely from channel 14 and fender walls 12 and 13. This transmission can be effected along tethered lines such as cable or land line, or wirelessly, as with the transducer pairs 16 to processor suites, 28 and 29, by way of RF carrier, cellular, laser, satellite uplink, FOI, 802.11 and Bluetooth, to just name a few. The acoustical signals reflected back to transducer pairs 16 are sent to processor suites 28 and 29, converted to electrical signals for processing by the CPU and imaged to three-dimensional visual images by an imaging device for outputting to a monitor or a printer or saved to a file on a computer server. This is all accomplished through data acquisition and presentation software. For example, a Windows NT® based display and control software package can be used which acquires data from the processor suites and produces a three dimensional display of the ship hull.

While transducer pairs 16 are shown mounted to a first and second fender wall, 12 and 13 respectively, nothing herein limits transducer pairs 16 from being mounted on the sea floor or other support vessel or support member. Likewise, first and second processor suite, 28 and 29 respectively, can be mounted on a column or support vessel suspended above the surface of the water. In the preferred embodiment, each side of shipping channel 14 will be equipped with four transducer pairs 16, two of the four installed at high level 20 and the remaining two installed at low level 18. However, different numbers of transducer pairs 16 could be used depending on the size of shipping channel 14 and the size of ships 32 passing through channel 14.

Referring to FIGS. 3 and 4, a ship 32 is passing through a shipping channel 14. As shown in FIG. 4, transducer pairs 16 propagate horizontal 22 and vertical beams 24 of sonar pulses. The pulses reflect off of the ship 32 at its hull and are received by the transducer pairs 16 for processing as set forth above.

Nothing herein limits the number of transducer pairs that can be employed. In the preferred embodiment, eight pairs are employed, two pairs at each top and bottom locations on both fenders 12 and 13. If system redundancy is required, requested or desired, such as at important ports of entry (i.e., New York City), more arrays can be employed within a shipping channel to adequately handle the needs of a redundant system array. Nothing herein limits the use of multiple arrays wherein each array acts as its own separate network for the shipping channel but having the ability to communicate with one another to recognize ships that try to subvert the network of arrays by traveling different routes under different conditions with different loads.

Figure 6:
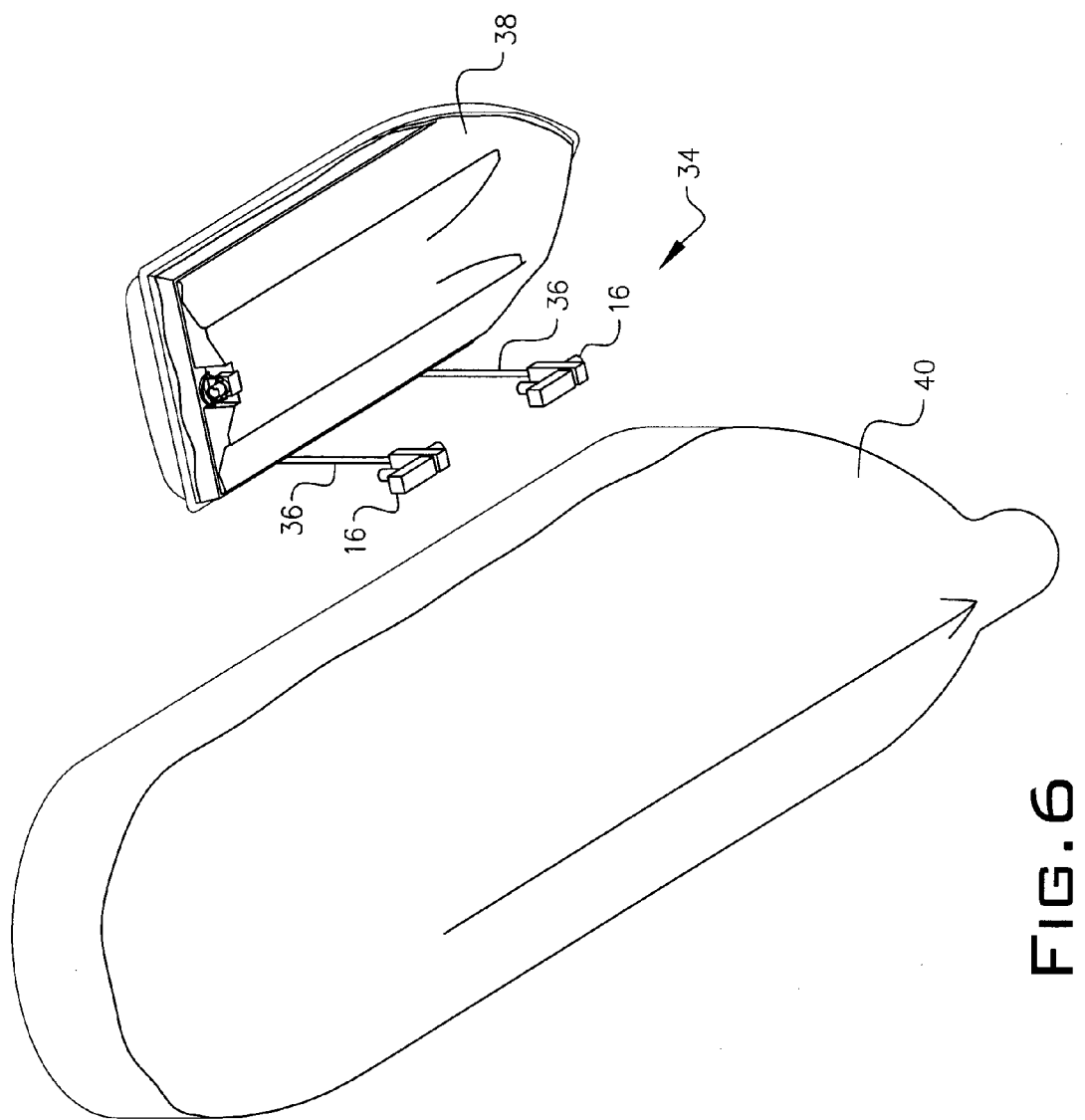
FIG. 6 is a bottom side perspective view of a support vessel employing an array of acoustic transducers of the present invention for rendering an image of a ship hull wherein the ship hull being examined is stationary and the array of acoustic transducers are moving around the stationary ship.
Figure 7:
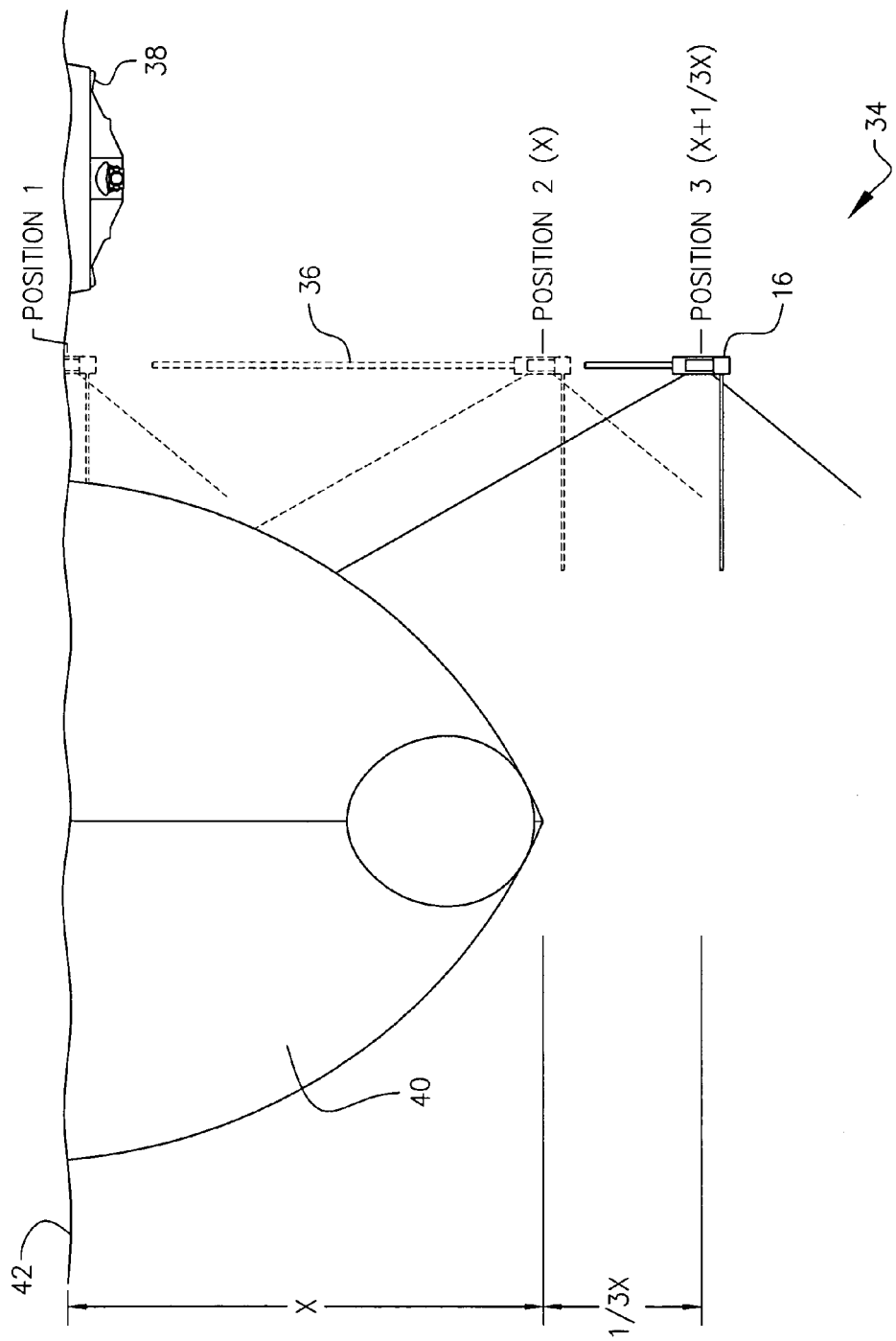
FIG. 7 is a back side view of a support vessel employing an array of acoustic transducers of the present invention for rendering an image of a ship hull wherein the ship hull being examined is stationary and the array of acoustic transducers are moving around the stationary ship, and wherein three different positions are illustrated for the same array.

As shown FIGS. 6 and 7, the present invention can also be used as a mobile transducer array 34 such that at least one transducer pair 16 is mounted upon a remotely operated pan and tilt actuated pole device 36 of a support vessel 38. Pole device 36 allows the position of transducer pair 16 mounted on an end portion to be lowered into the water to a desired depth. As shown in FIG. 7, Position 3 is the preferred depth, wherein a ship hull 40 from a water line 42 has a height of x and at least one transducer pair 16 mounted on pole device 36 is lowered into the water and beneath ship hull 40 from support vessel 38 to a depth of X+1/3X.

Mobile array 34 can be used in conjunction with stationary array 10 or wholly independent therefrom. For instance, a ship could pass through shipping channel 14 and be imaged be stationary array 10. If the rendered image is adequate for the inspection, there would be no need to, necessarily, render an additional image by mobile array 34. However, if the image is inadequate, mobile array 34 could be used to supplement that portion of the image that was not visible. The reverse is also true, wherein mobile array 34 is first used to render an image. If adequate, stationary array could be by-passed. However, if inadequate, then the ship could be directed through shipping channel 14 to complete or supplement the image.

Figure 8:
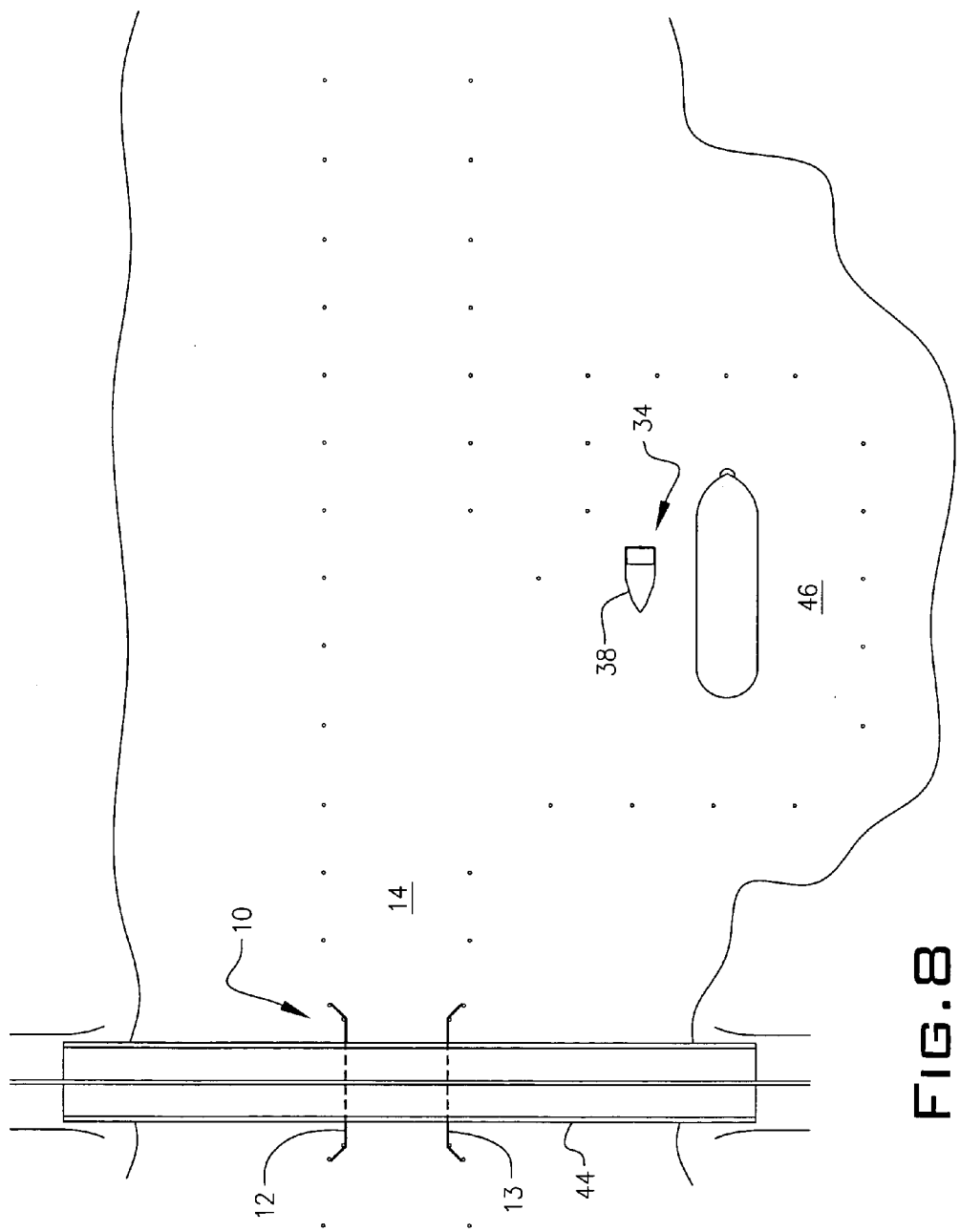
FIG. 8 is a top plan view of a body of water illustrating a shipping channel and an anchorage area wherein the present invention is employed as a stationary configuration in the shipping channel and is employed as a mobile configuration in the anchorage area.

Referring to FIG. 8, a top plan view of a portion of a port of entry is shown. Shipping channel 14 passes underneath a bridge 44 and through fenders 12 and 13 where stationary array 10 is employed. An anchorage area 46 is also provided wherein mobile array 34 is used with support vessel 38.

Equivalent elements can be substituted for the ones set forth above such that they perform in the same manner in the same way for achieving the same result.

What is claimed is:

1. A ship hull imaging system for the use in a shipping channel or bay, the imaging system comprising:
    a) at least one fixed acoustic transducer array employed below a water level in which the ship hull is present for sending an acoustic signal through the water and receiving a reflected signal, the acoustic and reflected signal providing data for rendering an actual image of the ship hull, each at least one fixed acoustic transducer array comprising a first transducer head oriented to propagate sound waves in a horizontal plane and a second transducer head oriented to propagate sound waves in a vertical plane, both the first and second transducer heads propagating sound waves simultaneously;
    b) at least one processor suite installed above the water level coupled to the at least one fixed acoustic transducer array;
    c) a central processing and imaging unit for converting the data provided by the acoustic and reflected signal into information that is interpretable as the actual image of the ship hull; and
    d) means for communication between the at least one processor suite and the central processing and imaging unit.

2. The ship hull imaging system of claim 1, wherein a plurality of acoustic transducer arrays are employed along a pair opposed fender walls of a shipping channel.

3. The ship hull imaging system of claim 2, wherein a first portion of the plurality of acoustic transducers arrays are mounted at an upper level of the fender walls below a water level, and a second portion of the plurality of acoustic transducer arrays are mounted at a lower level of the fender walls near a sea floor.

4. The ship hull imaging system of claim 1, wherein the first transducer head of each pair is mounted on a swivel permitting rotation upwards and downwards.

5. The ship hull imaging system of claim 1, wherein the second transducer head of each pair is mounted on a swivel permitting sideward rotation.

6. The ship hull imaging system of claim 1, where the at least one acoustic transducer array is mounted on a remotely operated pan and tilt actuated pole member of a support vessel.

7. The ship hull imaging system of claim 1, wherein at least one processor suite collects data from the at least one acoustic transducer array.

8. The ship hull imaging system of claim 1, wherein the means for communicating between the at least one processor suite and the central processing and imaging unit is a tethered cable.

9. The ship hull imaging system of claim 1, wherein the means for communicating between the at least one processor suite and the central processing and imaging unit is a wireless communication protocol.

10. The ship hull imaging system of claim 1, wherein the central processing and imaging unit integrates and combines the received data from the at least one acoustic transducer array to produce a high resolution video image of the ship's hull.

11. A ship hull imaging system for the use in a shipping channel, the imaging system comprising:
    a) a plurality of acoustic transducer arrays employed along a pair of opposed fender walls of the shipping channel below a water level in which the ship hull is present for sending an acoustic signal through the water and receiving a reflected signal, the acoustic and reflected signal providing data for rendering an actual image of the ship hull;
    b) at least one processor suite installed above the water level coupled to the plurality of acoustic transducer arrays;
    c) a central processing and imaging unit for converting the data provided by the acoustic and reflected signal into information that is interpretable as the actual image of the ship hull; and
    d) means for communication between the at least one processor suite and the central processing and imaging unit.

* * * * *